Feb. 3, 1959  R. F. DUNCAN  2,872,086
MACHINE FOR MAKING ORNAMENTAL POMPON BOWS
Filed July 19, 1955  4 Sheets-Sheet 1

INVENTOR
RICHARD F. DUNCAN
BY
ATTORNEYS

Feb. 3, 1959

R. F. DUNCAN

2,872,086

MACHINE FOR MAKING ORNAMENTAL POMPON BOWS

Filed July 19, 1955

INVENTOR
RICHARD F. DUNCAN
BY
Carpenter, Abbott, Coulter + Kinney
ATTORNEYS Feb. 3, 1959 — R. F. DUNCAN — 2,872,086
MACHINE FOR MAKING ORNAMENTAL POMPON BOWS
Filed July 19, 1955 — 4 Sheets-Sheet 3

INVENTOR
RICHARD F. DUNCAN
BY
Carpenter, Abbott, Coulter & Kinney
ATTORNEYS

Feb. 3, 1959   R. F. DUNCAN   2,872,086
MACHINE FOR MAKING ORNAMENTAL POMPON BOWS
Filed July 19, 1955   4 Sheets-Sheet 4

FIG. 9

INVENTOR
RICHARD F. DUNCAN
BY
Carpenter, Abbott, Coulter & Kinney
ATTORNEYS

United States Patent Office 2,872,086
Patented Feb. 3, 1959

2,872,086

MACHINE FOR MAKING ORNAMENTAL POMPON BOWS

Richard F. Duncan, St. Paul, Minn., assignor to Minnesota Mining & Manufacturing Company, St. Paul, Minn., a corporation of Delaware Application July 19, 1955, Serial No. 526,856

15 Claims. (Cl. 223—46)

This invention relates to the art of "gift wrapping" packages and provides a novel machine for making ornamental pompon bows, particularly of the kind disclosed and claimed in United States Patent No. Re. 23,835, issued February 26, 1952, upon an application by Thomas L. McMahon. This application is a continuation in part of my co-pending application Serial No. 366,844, now abandoned.

In recent years the gift wrapping of packages has become a highly commercialized business. Various manufacturers have placed many new and attractive gift papers, decorative ribbons and the like on the market and various women's magazines have frequently featured articles promoting these materials, and the idea of gift wrapping in general.

One recently developed article which has proved to be very popular in the wrapping of fancy packages is the partially manufactured bow of the above identified Patent No. Re. 23,835. The bow of that invention has made it relatively easy for any person (even one who has had little experience in gift wrapping) to make a very attractive and symmetrical pompon bow; i. e., a decorative bow fashioned from many loops of ribbon to resemble a tufted ball.

However, previous to the present invention, it has been necessary for persons desiring to make the bow of the above identified patent to wind and cut the ribbon in the prescribed manner, by means of apparatus which was not altogether suitable for the purpose. For example, when scissors were used to notch or otherwise cut the bow, the overlying convolutions in the hank of ribbon would frequently become disarranged, and thus make the tying of the bow more difficult. Furthermore, even though the winding and cutting were accomplished without disarrangement of the hank, or other difficulty, the time consumed in such operation was considerable and thus disadvantageous, particularly when the bows were being made at busy gift-wrap counters in department stores, etc.

It is an object of the present invention to remedy the foregoing disadvantages and to provide a machine whereon a length of ribbon can be wound in the proper manner into a hank of desired size, and then quickly and easily notched and tied to form a partially manufactured bow.

It is a further object of the invention to provide a machine (for the purpose above set forth) which can be easily operated, and which will occupy only a small amount of space.

Other objects and advantages of the invention will be apparent from the following detailed description, and the accompanying drawings, in which latter:

Referring now to the drawings in more detail (wherein like reference characters indicate like parts), reference character 2 designates the base of the machine. Affixed to and projecting upwardly from said base is standard 3, which is provided for support for the operating mechanism hereinafter described.

In the particular machine illustrated, standard 3 may be fabricated of cast iron or aluminum and is formed with a hollow interior. Portions 4 of the side edges of said standard are open, thus providing a slot, in standard 3, within which tie roll 5 can be rotatably mounted. It will be noted that open side portions 4 extend far enough along the edges of standard 3 so that a tie roll of greater diameter than the one illustrated may be employed. Tie roll 5 is supported in rotating position, within standard 3, by thumb screw 6 passing through standard 3 and through the core of said tie roll.

Roll supporting shaft 7 may be affixed upon the side of standard 3 in either of two positions. In the accompanying drawings, said shaft is shown in its upper position, where it would normally be when roll of decorative ribbon 8 is of the approximate size shown. However, when roll 8 is of larger diameter, shaft 7 may be lowered and affixed in aperture 9 (see Figure 2) so that its periphery will clear cutting bar 10. When shaft 7 is in its lower position, it is desirable to mount the entire apparatus of this invention upon a block (or other structure) in order to raise it sufficiently so that the lower edge of roll 8 will be spaced from the table or other surface upon which the machine is set.

Cutting bar 10, above referred to, is provided with cutting edge 11, and is affixed upon the side of standard 3 by thumb screws 12 and 13. Said bar 10 projects outwardly from standard 3 over shaft 7, and desirably, is tilted upwardly (in the manner shown particularly in Figure 2) so that cutting edge 11 will be readily accessible when it is used to sever a length of ribbon from roll 8 (or roll 8a or 8b) in the manner hereinafter described. In order to provide for replacement of cutting edge 11, when it has become dulled, I affix it upon bar 10 with screws 14 and 15. A razor blade may conveniently be used to provide said cutting edge, and it may be easily and quickly replaced by removing screws 14 and 15.

Flanged plate 16 is placed over blade 11 in order to maintain said blade rigidly upon bar 10, and to cover the second shap edge of said blade, if a two edged blade is used. Plate 16 is also useful for carrying a message warning of the close proximity of a sharp blade. Cutting edge 11 is mounted on bar 10 with its sharp edge projecting only a slight distance beyond the edge of bar 10. Blade guard 17, comprising a channeled strip of steel, is hung from screw 12 on spring 18. Said blade guard may be snapped over the edge of bar 10 when the machine is not in use.

The ribbon winding mechanism of this machine is mounted at the top point of standard 3. This mechanism includes shaft 19, crank 20, bar 21 and ribbon supports indicated generally by reference characters 22 and 22a.

Shaft 19 passes transversely through standard 3 and is rotatable therein. The ends of said shaft project outwardly beyond standard 3 and crank 20 is mounted on one of said projecting ends, being there secured by nut 23. Bar 21 is mounted on the other projecting end of shaft 19 and is also secured on said shaft, by nut 24. Said bar 21 is divided into units of measurement (as shown) and ribbon supports 22 and 22a are slidably mounted on its end portions. Each of said ribbon supports comprises a sleeve 25 which fits slidably over bar 21, and an arm 26 which projects outwardly from said sleeve, over shaft 7. The inner surface of each of said sleeves 25 may be fitted with a spring catch which will engage spaced depressions along the surface of bar 21 to prevent said sleeves, or either of them, from sliding away from the ends of bar 21, toward the mid-portion thereof, until said spring catches are disengaged by tilting said sleeves on bar 21.

Finger 27 is affixed in abutment against one of said arms 26. This finger is somewhat springy and may be separated from arm 26 to permit insertion of the end of the ribbon on roll 8 (or roll 8a or 8b) between said finger and said arm. Upon release of said finger after the tip of ribbon has been placed between it and arm 26, it will spring back into abutment against arm 26 and serve to hold the ribbon end in place for winding.

In operation of the ribbon winding mechanism, ribbon supports 22 and 22a are first adjusted so that they will be spaced apart a distance (according to the measure on bar 21) equal to the length of hank desired. The free tip of the ribbon wound on roll 8 is then slipped between arm 26 and finger 27. Crank 20 is then turned, whereupon supports 22 and 22a will rotate about an axis parallel to the axis of shaft 7 and a length of ribbon will be wound into a hank about arms 26. It is desirable that at least three to six yards of ribbon be wound on said arms in order to obtain a hank which will be convertible into a "full" and completely symmetrical bow.

Figures 3, 4, 5, 6:
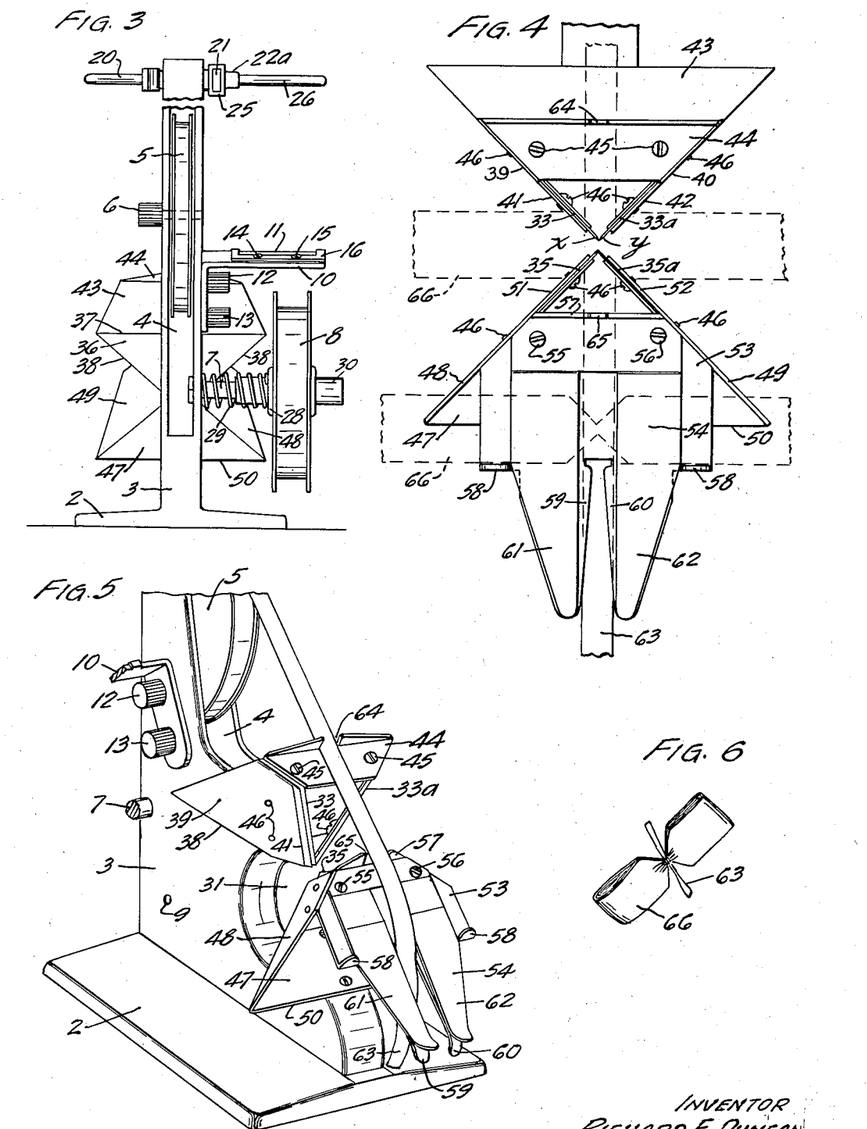
Figure 3 is a rear view, without attachment.
Figure 4 is a plan view of the ribbon notching element.
Figure 5 is a perspective view of the ribbon notching element.
Figure 6 is a perspective view of a hank of ribbon which has been notched and tied on the machine of this invention.
Figure 7:
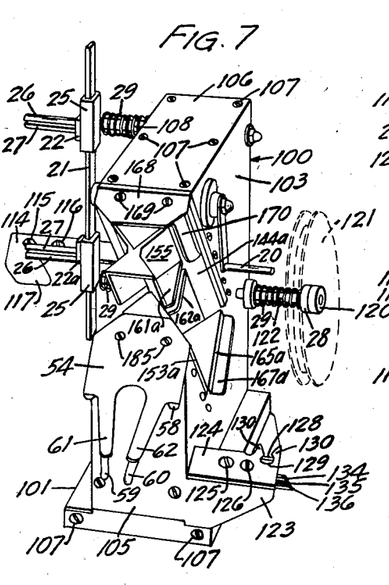
Figure 7 is a view in perspective of an alternative bow tying device.
Figure 8:
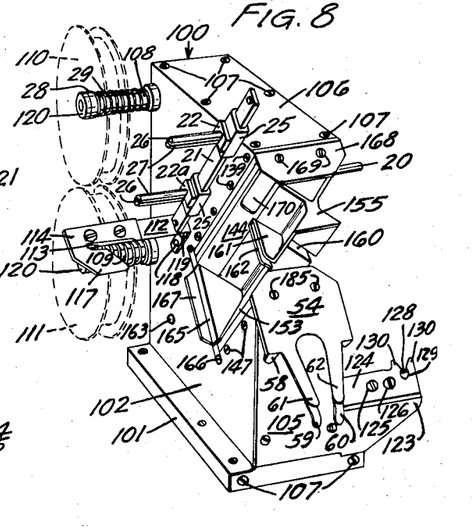
Figure 8 is another view in perspective showing the other side of the bow tying device of Figure 7.

Shaft 7 is fitted with flanged sleeve 28 and coil spring 29, which spring is under compression as shown in Figure 3, for example, and thus urges said sleeve outwardly along shaft 7 to press roll 8 into abutment against lock nut 30 which is turned on to the end of shaft 7. Roll 8 is thereby maintained secure against wobbling or sliding along shaft 7 when ribbon on it is wound about supports 22 and 22a. By means of this arrangement, each succeeding layer of ribbon wound on the hank will exactly overlie the preceding layers of ribbon.

After a hank of ribbon has been wound, it is severed from roll 8 on cutting edge 11. It is then removed from arms 26, and notched and tied on the mechanism hereinafter described.

The forwardly facing edge of standard 3 comprises an inclined surface interrupted by a U-shaped recession 31: See Figure 2. There is thus formed on the forward edge of the machine an upper inclined surface 32 for mounting an upper pair of notching blades 33 and 33a, and a lower inclined surface 34 for mounting a lower pair of notching blades 35 and 35a. Each of said pairs of blades is contained in a housing comprising a base, side walls and top. The housing for each set of blades is substantially similar to the other, but the upper housing is inverted in relation to the lower housing, and vice versa. Also, there are certain differences in the cover construction for the housings, as will be hereinafter set forth.

Referring first to the housing for the upper pair of blades 33 and 33a, base 36 of said housing is affixed upon upper inclined surface 32. Said base 36 is the shape of an isosceles trapezoid and is mounted on surface 32 with its longest edge 37 facing upward. Side edges 38 of said base converge toward each other as they extend downwardly: See Figure 3.

Side walls 39 and 40 of said upper housing are integral with base 36 thereof. Said side walls extend off side edges 38 of the base and converge to a point as they extend downwardly along side edges 38. Edges 41 and 42 of said side walls are "swept back" (see Figure 2) and diverge from each other (to form a V-shape) as they extend upwardly: see Figures 4 and 5. Cover 43 is placed over said housing and guide plate 44 is also secured thereon by screws 45. Upper notching blades 33 and 33a are removably attached to the inner surface of side walls 39 and 40, in this case by screws 46. The cutting edges of said blades protrude slightly beyond edges 41 and 42 of the side walls. As will be noted from Figure 4 of the drawings, said blades form a V-shape, with the lowermost corner X of blade 33 in contiguity with the lowermost corner Y of blade 33a. Said blades are thus adapted to form a notch of V-shape on one edge of a hank of ribbon: See Figure 6.

The housing for lower notching blades 35 and 35a likewise comprises a base 47 and side walls 48 and 49. Said base 47 is of the same general shape as base 36 but in this case is mounted with its longest edge 50 downward. Side walls 48 and 49 converge as they extend upwardly (see Figure 3) and have edges 51 and 52 which diverge upwardly from a point. Lower notching blades 35 and 35a are removably mounted on side walls 48 and 49 by screws 46, with their cutting edges protruding somewhat beyond edges 51 and 52. Notching blades 35 and 35a (like upper blades 33 and 33a) form a V-shape, and are adapted to cut a V-shaped notch from the other edge of the hank of ribbon being processed.

Figure 2:
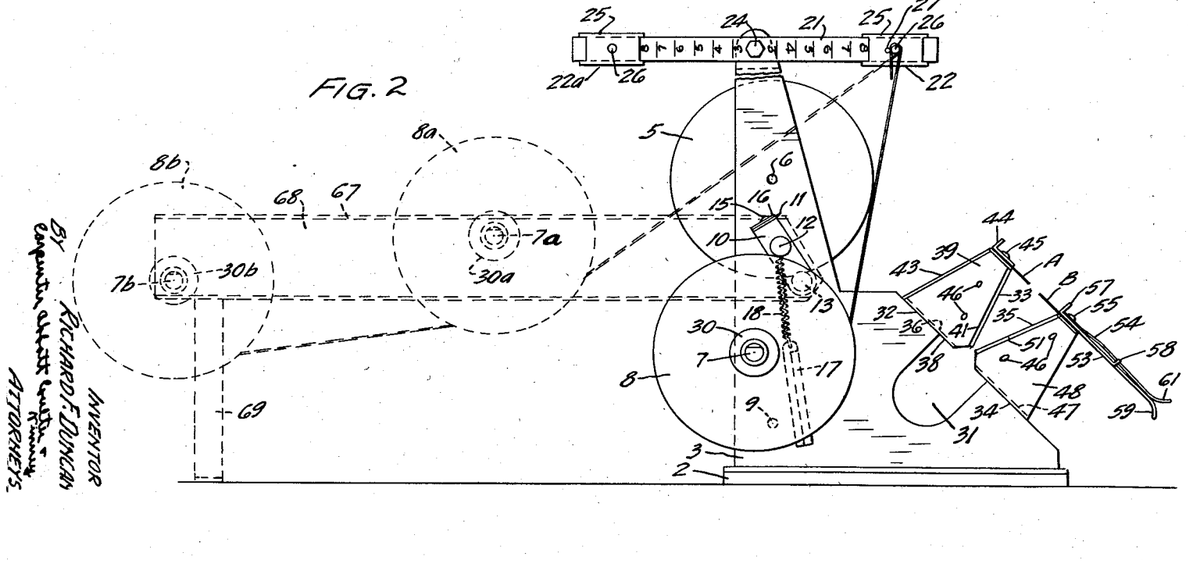
Figure 2 is a side elevational view, with attachment.

The arrangement above described is such that upper notching blades 33 and 33a converge to a point, as they extend downwardly; lower notching blades 35 and 35a do likewise, and also, the upper pair of blades, on the one hand, and the lower pair of blades, on the other hand, converge toward each other as they extend downwardly: see Figure 2.

A hank holding arrangement is affixed on the top of the lower housing element. This arrangement comprises plate 53 and spring member 54, both of which are secured on the lower housing (with spring member 54 overlying plate 53) by screws 55 and 56.

Plate 53 is provided at its top edge with slotted flange 57 for guiding and holding tie ribbon 5 as it is drawn over the ribbon notching mechanism, in the manner hereinafter described. Intermediate the length of plate 53, ears 58 are formed upon it, and spaced-apart extensions 59 and 60 project downwardly beyond said ears. Said spring 54 essentially comprises resilient prongs 61 and 62 which overlie extensions 59 and 60 and which can be sprung upwardly away from said extensions.

Preparatory to notching a hank of ribbon, the end of ribbon 63 (see Figure 5) on tie roll 5, is drawn through notch 64 in guide plate 44 and thence downwardly to span the gap between the housings for the upper and lower blades. The tie ribbon is then threaded through guide slot 65 in flange 57 and between extensions 59 and 60.

After this has been done, and hank of ribbon 66 has been removed from arms 26, it is grasped at its ends by the operator and held over the gap between the upper and lower housings. It is then moved firmly downward toward recession 31. As it progresses downwardly, upper blades 33 and 33a will excise a V-shaped notch from one edge of the hank, and lower blades 35 and 35a will excise an opposed V-shaped notch from the other edge of the hank, to provide an article cut substantially as shown in Figure 6 of the drawings. The depth of the notch taken out from each side of the hank will depend upon the amount of space between the lower corners of the upper blades and the upper corners of the lower blades. I find it desirable to leave a space of about 3/16" between the tips of the upper blades and the tips of the lower blades so that the hank will not be notched too deeply and thus seriously weakened, when it is cut on the machine.

Recession 31 provides space into which hank 66 can be advanced after it is cut in the manner above described.

After the hank has been notched, the operator temporarily releases one end of it, and withdraws the hank from the U-shaped recession 31. The operator then again grasps the end which has been temporarily freed and, holding the hank flat, inserts it upwardly between the extensions (59 and 60) and the prongs (61 and 62). It will be noted (see Figure 2) that the lower tips of the extensions, on the one hand, and the prongs, on the other hand, are turned away from each other to facilitate the insertion of the notched hank of ribbon into the hank holding arrangement. The hank is then raised upwardly between these members, so that its lower edge will rest upon ears 58.

As heretofore mentioned, tie ribbon 63 was drawn across the gap between the housings before the notching operation was accomplished, so when the hank of ribbon itself was moved downwardly into the gap between the housings, for notching, it carried tie ribbon 63 ahead of it, and that ribbon was thus severed from the main length of ribbon on tie roll 5, at the same time that hank 66 was notched.

Thus, after notched hank 66 has been inserted in the hank holding arrangement, in the manner above described, a severed length of tie ribbon 63 is available for use in tying the hank about its notched portion. After the operator has the notched hank inserted in the hank holding arrangement, he releases the ends of the hank and grasps the two free ends of the severed length of tie ribbon 63 and ties the hank at its notched midportion. The hank is then removed from the hank holding arrangement and is ready to be converted into a pompon bow.

In order to minimize the likelihood that someone might inadvertently thrust his hand or finger into the gap between the housings for the upper and lower notching blades, and thereby be cut thereon, I provide a pair of transparent flexible plastic shields over said gap. Said shields, designated by reference characters A and B, are shown in Figure 2 of the drawings. As there indicated, shield A is affixed to the upper housing and extends downwardly therefrom to overlie about ⅜ of the gap above mentioned. Similarly, shield B, affixed to the lower housing, extends upwardly for about the same distance. Therefore, only about one-fourth of the gap between the housings is entirely open. Shields A and B do not interfere with the use of the machine for, being flexible, they will be pushed inwardly when a hank of ribbon is moved downwardly between them into the gap. However, said shields do serve to prevent the operator from accidentally brushing his hand against one of the notching blades and are also useful for imprinting a warning message as to the presence of said blades.

Attachment 67, upon which additional rolls of ribbon 8a and 8b are mounted, is provided so that a multicolored hank of ribbon can be wound on the apparatus of this invention. This attachment (see Figures 1 and 2) comprises extension arm 68, one end of which is provided with two apertures through which said arm may be attached to standard 3 by thumb screws 12 and 13. The rearwardly extending end of arm 68 is fitted with leg 69 and serves to hold said arm on a horizontal plane. Shafts 7a and 7b, mounted on arm 68 by nuts 70a and 70b, are fitted with flanged sleeves 28a and 28b and coil springs 29a and 29b, which latter serve to maintain rolls 8a and 8b in proper alignment, just as spring 29 does in respect to roll 8, heretofore described. Lock nuts 30a and 30b are turned on to the ends of shafts 7a and 7b to maintain the rolls of ribbon upon said shafts. It will be noted that shafts 7a and 7b are spaced apart from each other, and from the supporting surface, a distance sufficiently great so as to allow for the use of ribbon rolls having a diameter greater than those illustrated.

In use of the machine, with attachment 67, shafts 7, 7a and 7b are loaded with rolls of ribbon of complementary or contrasting color. The tip of the ribbon from each of said rolls is inserted between finger 27 and arm 26 and crank 20 is then turned, whereupon ribbon from each of said rolls will be withdrawn and wound into a single hank of three different colors.

Referring now to Figures 7–12, an alternative bow tying device illustrating and embodying the principles of the present invention and employing an improved, safe, and accurate means for notching the ribbon hank is shown. In the improved notching device, the notching blades remain unexposed and foreclosed from accessibility to the hands of the operator, thus making it virtually impossible for him to injure himself in the act of notching the ribbon hank.

In the embodiment illustrated, an assembled body 100 of sheet metal is provided having a base 101 of somewhat greater width than the remainder of the body. The body 100 is comprised of side walls 102 and 103, a rear wall 104 connecting the side walls, a shortened front wall 105 extending upwardly from the base and also connecting the side walls, and a top 106 extending forwardly from the rear wall but being somewhat shorter than the length of the base 101. A portion of the body 100 is left open providing a space in which the improved notching device, to be hereinafter defined, is mounted. A series of appropriately placed screws 107 hold the several components of the body 100 together.

A pair of roll supporting shafts 108 and 109 extend horizontally outwardly from the side wall 102 of the body 100. The two roll supporting shafts provide a pair of supports on which supply rolls of decorative ribbon 110 and 111 may be rotatively mounted. When a single colored bow is to be prepared generally only one supply roll is employed. However, where it is desired to prepare a multi-colored ornamental pompon bow, ribbon from the rolls 110 and 111, which contain decorative ribbon of complementary or contrasting colors, will be employed simultaneously.

A cutting bar 112 extending horizontally outwardly from side wall 102 is provided with a cutting edge 113 (which may consist of a razor blade or the like) and a guard 114 affixed to the cutting bar 112 by means of screws 115 and 116. The guard is provided with a forwardly and inwardly extending arm 117, providing access to the cutting edge 113 only through a slot formed between the guard and said arm. Thus although a thin ribbon length may easily be inserted in the slot and severed, thicker objects may not. The operator is protected from the exposed cutting edge. Where the cutting edge consists of a razor blade it may be positioned between the cutting bar 112 and the guard 114 and be also held in place by the aforementioned screws 115 and 116. The cutting bar 112 is affixed to the side wall 102 by means of screws 118 and 119 at a position such that the cutting edge 113 will be readily accessible when used to sever a length of ribbon from either or both of the rolls 110 and 111 in the manner hereinafter described. When the cutting edge 113 has become dulled through use, the blade may conveniently be replaced by removing the screws 115 and 116.

The ribbon winding mechanism of the machine is mounted near the top of the body 100 and in the forward portion thereof. As described hereinabove, this mechanism includes a rotatably mounted shaft extending through side walls 102 and 103, crank 20 affixed the end of the shaft extending through side wall 103, and bar 21 affixed the end of the shaft extending through side wall 102. Bar 21 contains ribbon supports indicated generally by reference characters 22 and 22a. Said bar 21 is divided into units of measurement and ribbon supports 22 and 22a are slidably mounted on its end portions. Each of the said ribbon supports comprises a sleeve 25 which fits slidably over the bar 21, and an arm 26 projecting outwardly from the sleeve, parallel with the said shafts 108 and 109. As previously described, a spring catch affixed to each of the sleeves is positioned to engage spaced depressions along the surface of the bar 21 to permit convenient adjustment of said sleeves along the bar 21.

Fingers 27 are positioned in abutting relationship with arms 26 and closely adjacent therewith. The fingers 27 are sufficiently springy to permit them to be separated from the arms 26 for the insertion of an end of withdrawn length of ribbon from the rolls 110 or 111 or each of them. Upon release of the said finger after the tip of the ribbon has been placed between one of them and the arm 26, it will spring into abutment against the arm 26 and serve to hold the ribbon end in place for winding.

Figure 1:
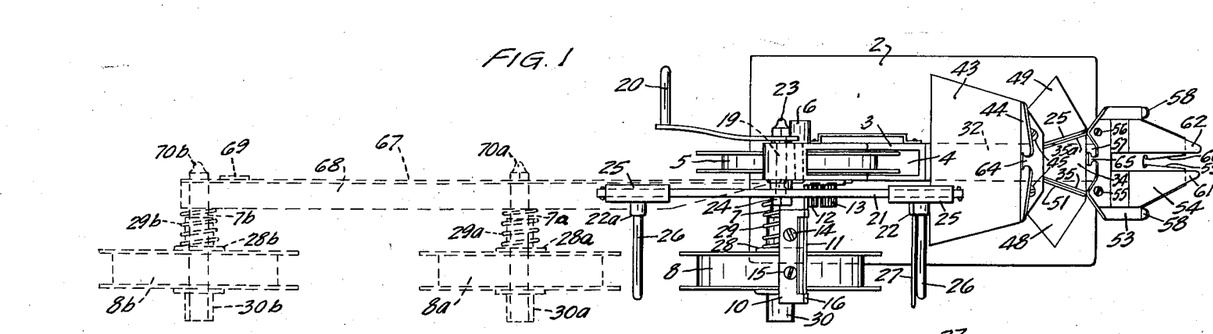
Figure 1 is a plan view, with attachment.

The shafts 108 and 109 are identical in structure with that shown in Figures 1 and 3 and each contains a flanged sleeve 28 and a partially compressed coil spring 29 which urges the sleeve outwardly along the shaft and forces the roll 108 (109) into abutment against a lock nut 120 which is affixed to the end of the shaft. The roll of decorative ribbon is thereby maintained secure against wobbling or sliding along the shaft when ribbon is unwound therefrom and wound about the arms 26. By means of this arrangement, each succeeding layer of ribbon wound on the hank will exactly overlie the preceding layers of ribbon.

After a hank of ribbon has been wound on the ribbon winding mechanism as previously described, it is severed from the decorative ribbon roll on cutting edge 113. It is then removed from the arms 26, and notched on the margin and tied with a short length of tie ribbon as will be presently described.

A supply roll of tie ribbon 121 is mounted on a shaft 122 extending horizontally outwardly from side wall 103. The arrangement and assembly of the shaft 122 is identical with that of shafts 108 and 109 and contains the flanged sleeve 28, coil spring 29, and lock nut 120.

A tie ribbon severing assembly extends laterally outwardly from the forward edge of side wall 103 and includes a blade supporting arm 123 which is an extension of the front wall 105. A guard 124 is affixed to the supporting arm by means of screws 125 and 126 with a cutting blade being held between the guard and the severing arm. The guard is of such width that the cutting edge 128 of the blade is completely inaccessible except for a small recession 129 therein. A pair of opposed ears 130 guard the exposed cutting edge and define a narrow access opening through which a withdrawn length of tie ribbon may be passed in the act of severing the same.

An extension of the guard 124 extends downwardly and rearwardly from the supporting arm 123 and terminates in a laterally extending tie ribbon guide arm provided with a pair of ribbon guiding slots which define ribbon supporting tips 134, 135 and 136. The end portion of a withdrawn length of tie ribbon is led over the tips 134 and 136 and under the middle tip 135. In this manner an end of tie ribbon is retained accessible to the forward of the machine.

The upper forwardly facing edges of the side walls 102 and 103 are interrupted by identical inclined rectangular shaped recessions on which the notching mechanism is mounted. A cast upper blade mount 137, on which a pair of converging notching blades 138 and 138a is mounted is removably affixed to the upper edges of the side wall recessions by means of a series of screws 139. The mount 137 has a pair of walls 140 and 140a extending inwardly from the said upper edges toward each other at an angle of approximately 90°. In the lower portion of the mount 137 the walls 140 and 140a converge along a line 141. The continuity of convergence is interrupted by a recession 142 in the said walls 140 and 140a which permits removal of the notched ribbon hank as will be hereinafter described. In the upper portion of the mount 137, the walls 140 and 140a, where they terminate, are joined by a flat portion 143. From the lower end of the flat portion 143, the outer edges of the walls 140 and 140a extend gradually outwardly and downwardly toward the upper point of the aforesaid line of convergence 141. It is against this latter mid-portion of the walls 140 and 140a that the upper pair of notching blades 138 and 138a is mounted. A pair of blade clamps 144 and 144a extending along the side walls 140 and 140a, respectively, removably retain the upper pair of notching blades 138 and 138a, respectively, in position against the walls 140 and 140a by means of screws 145.

A cast lower blade mount 146, similar in shape to the upper blade mount 137, though shorter in length, is removably affixed to the rearwardly facing edges of the side wall recession by means of a series of screws 147 in a position directly opposite the said mount 137. The lower blade mount 146 has a pair of walls 148 and 148a extending inwardly from the said rearwardly facing edges toward each other at an angle of approximately 90°. At the lower portion of the mount 146 the walls 148 and 148a converge along a line 149 of the same length as and exactly opposite to the aforesaid line 141. The continuity of convergence along line 149 is interrupted by a recession 150 in the walls 148 and 148a identical with and exactly opposite to the said recession 142. In the upper portion of the mount 146, the walls 148 and 148a, where they terminate, are joined by a flat portion 151 of identical width with that of aforesaid flat portion 143 and the lower end of which is positioned exactly opposite the lower end of the last mentioned flat portion. At the lower end of the flat portion 151 the outer edges of the walls 148 and 148a extend gradually rearwardly and downwardly toward the upper point of the line of convergence 149, in a manner identical with and opposed to the corresponding portion of the upper mount 137. It is against this latter-mentioned mid-portion of the walls 148 and 148a that a lower pair of converging notching blades 152 and 152a is removably affixed in opposed relationship to the upper pair of blades. A pair of lower blade clamps 153 and 153a which extend along the walls 148 and 148a removably retain the blades against the side walls 148 and 148a by means of screws 154.

The blades are positioned in the respective mounts 137 and 146 in such manner that the cutting edges protrude slightly beyond the edges of the corresponding walls of the aforesaid mounts. As will be noted from Figures 9 and 11, each pair of blades forms a V-shape with each other. The cutting edges of the upper pair of blades 138 and 138a are in contact at the apex of the V and the cutting edges of the lower pair of blades 152 and 152a are likewise situated. Also, as may be seen in Figure 9, the upper and lower pairs of blades converge downwardly toward each other with a gap being left between the lowermost extremities of the pairs of blades. Thus a ribbon hank may be notched on each edge by being passed therebetween.

An elongate notching blade cage 155 is slidably positioned between and supported by the said mounts 137 and 146. The cage 155 is formed by casting and is comprised of a pair of opposed right angle elements having walls 156 and 156a and 157 and 157a respectively, the angles being connected at the apexes 158 thereof. The walls 156 and 156a of the first of said elements are of such a length that the inner surfaces thereof ride on and contact the converging portions of the walls 148 and 148a of the lower blade mount 146 with the ends of walls abutting the rear edge of blade clamps 153 and 153a. The walls 157 and 157a of the second of said right angle elements are fashioned to ride over the converging portions of walls 140 and 140a of upper blade mount 137. The said walls 157 and 157a have offset extensions 159 and 159a, respectively, which ride over and in contact with upper blade clamps 144 and 144a. The portion of the cage 155 where the apexes 158 connect is sufficiently thin to permit passage thereof between the forementioned gap between the lower extremities of the opposed pairs of notching blades.

The continuity of the blade cage 155 along the length thereof is interrupted by a recession 160 extending into the cage from the forward edge of the walls 156 and 156a rearwardly through the apexes 158 and into the walls 157 and 157a. Upper and lower opposed ribs 161 and 162 extend from the edges of said recession across and between the external surfaces of the walls 156 and 157. Identically formed opposed ribs 161a and 162a extend between walls 156a and 157a. The ribs serve the dual function of reinforcing the cast blade cage 155 and providing convenient means for the grasping and sliding of the cage by the operator in the act of notching a hank of ribbon.

An internal horizontal bar 163 is positioned between the side walls 102 and 103 of the body 100 and thereover is positioned a resilient cylindrical cushion 164 against which the cage 155 rests when in the proper lower position. The aforementioned recession 160 in the cage 155 is so positioned to be in register with the opposed recessions 142 and 150 of upper and lower blade mounts 137 and 146, respectively when the cage 155 is in the lower position.

A pair of side elements 165 and 165a containing approximately triangularly shaped portions extend inwardly from the bottom edges of the recessions in the side walls 102 and 103 to further foreclose the internal portions of the machine from access by the operator and are affixed to the side walls of the machine by means of screws 166. The said side elements 165 and 165a are further provided with laterally outwardly extending flanges 167 and 167a which may be grasped by the operator in the notching of a ribbon bank.

A plate 168, removably affixed the upper side of the upper blade mount 137 by means of screws 169, contains resilient spring clamps 170 which extend downwardly along and essentially parallel with the blade clamps 144 and 144a adapted to engage the extensions 159 and 159a of the cage 155 and retain the latter in a normal upward position.

The hank of ribbon is notched in the following manner: The hank is grasped at its ends by the operator and slipped into the cage recesion 160 with the center of the hank positioned approximately centrally of cage 155 while the cage is in the upward position. The cage 155 is then pushed downwardly by the operator by pressing upon the ribs 161 and 161a with the thumbs while the ribbon hank is maintained in the aforesaid position. The hands of the operator may be "braced" for this action by simultaneously grasping the flanges 167 and 167a with the fingers. As the cage 155 travels downwardly the ribbon hank comes into contact with the cutting edges of the two pair of cutting blades. A V-shaped notch is excised from one edge of the hank by the upper pair of blades 138 and 138a and an opposed V-shaped notch is excised from the other edge of the hank by the lower pair of blades 152 and 152a. After the ribbon hank has been notched the cage 155 travels downwardly still further, carrying the notched hank beyond and free of the blades, until the lower end thereof contacts cushion 164 and further progression is stopped. The ribbon hank is then released with one hand and withdrawn laterally from the machine with the other, the recession 160 then being in registry with recession 142 and 150.

Figure 9:
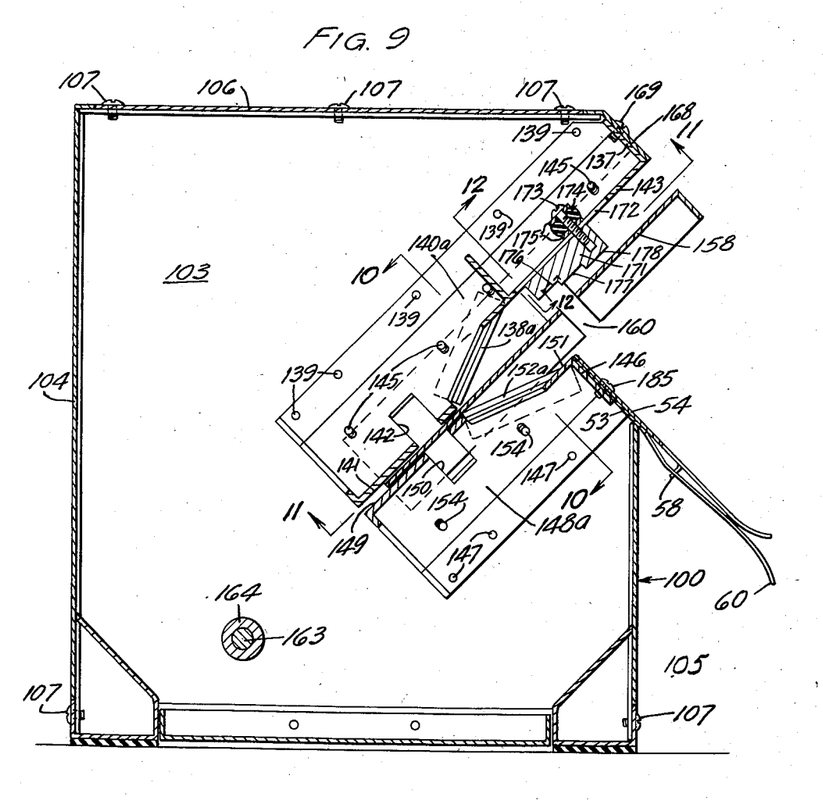
Figure 9 is a vertical sectional view taken through the center of the bow tying device of Figure 7.
Figure 10:
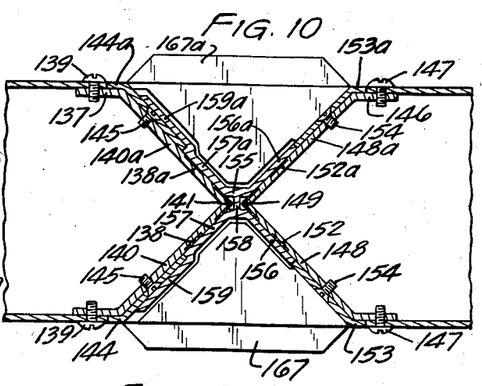
Figure 10 is a sectional view of the improved notching device taken along the lines 10 of Figure 9.
Figure 11:
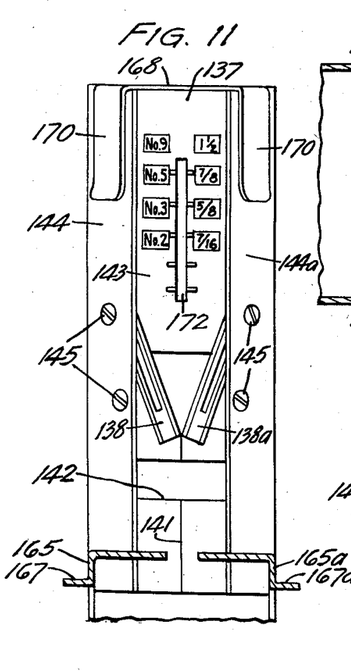
Figure 11 is a sectional view of the improved notching device taken along the lines 11 of Figure 9.
Figure 12:
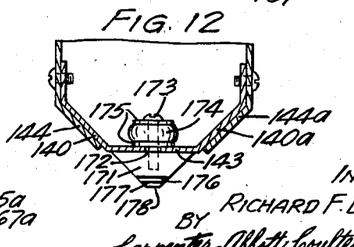
Figure 12 is a sectional view of the centering assembly taken along the lines 12 of Figure 9.

Although in the notching of the ribbon hank it is quite simple to properly center the hank longitudinally with respect to the cage 155, it is somewhat less simple to properly laterally center the hank so that the opposed notches extend to the same depth in the hank. Therefore a lateral centering device has been provided to insure the proper notching of the ribbon hank. Referring to Figures 9, 11 and 12, the centering device is seen to comprise a hank centering body 171 positioned for up and down sliding movement against the flat portion 143 of the upper blade mount 137. The body 171 is of a generally trapezoidal cross-section with the base abutting the flat portion 143. An elongated slot 172 is present in the flat portion 143 extending parallel with the sides thereof. A screw 173, extending from within the machine, is turned into the back side of said body against a resilient rubber washer 174 which is flanked by metal washers 175. The body 171 is thus urged tightly but movably against the flat portion 143.

A series of steps 176, 177 and 178 are provided in the body 171 with the flat side of said steps being parallel with the base of the body (Figure 9). As the body 171 is moved upwardly and downwardly along the slot 172, the steps 176, 177 and 178 in turn are positioned in register with the recession 160 of the upwardly positioned cage 155. The depth to which a ribbon hank may be inserted into the said recession 160 is thus restricted. The several steps of the body 171 permit ribbon hanks to be inserted into the recession 160 to varying depths as the body is moved along the slot 172. In this manner, the centering device permits ribbon hanks of several different widths to be properly notched on my novel machine. For example, should it be desired to notch a hank of relatively wide width, body 171 is moved along the slot 172 until the step 176 is in register with recession 160 as shown in Figure 9. Or where a still wider hank is to be notched, the body 171 is moved upwardly until clear of the recession 160 permitting the hank to be inserted to a depth where the edge of the hank bears against the surface of the flat portion 143. On the other hand, where a narrow hank is to be notched the body 171 is moved down along the slot 172 until the step 178 is in register with the recession 160.

In the device here shown (see Figure 11), the flat portion 143 is graduated into units of ribbon width corresponding to the width of ribbon centered when inserted into recession 160 against the step of the body 171 then in registry with the recession 160. Shallow notches provided in the flat portion 143 and extending laterally of the slot are engaged by a small flange (not shown) protruding from the back of the body 171 as the body is moved upwardly and downwardly, thus notifying the operator as the steps come in register with the recession 160.

In the notching of the ribbon hanks, the removed triangular segments of ribbon fall into the bow tying device. I therefore have provided a removable tray 179 in the underside of the body 100 of the device into which the waste ribbon segments fall to facilitate the removal thereof.

A hank-holding arrangement identical with that previously described is affixed to the top of the lower blade mount 146. This arrangement comprises a plate 53 and spring member 54, both of which are secured on the lower blade mount (with spring member 54 overlying plate 53) by screws 185. Intermediate the length of plate 53, ears 58 are formed upon it, and spaced-apart extensions 59 and 60 project downwardly beyond the said ears. Said spring 54 essentially comprises resilient prongs 61 and 62 which overlie extensions 59 and 60 and which can be sprung upwardly and away from said extensions.

After the hank has been notched and removed from the machine, the operator again grasps the end which had been temporarily freed and, holding the hank flat inserts it upwardly between the extensions 59 and 60 and the prongs 61 and 62 until its lower edge rests against ears 58. A length of tie ribbon is then withdrawn from the supply roll of tie ribbon 121 and severed on the cutting edge 128 and the hank is tied at its notched mid-portion therewith. The hank is then removed from the hank-holding arrangement and is ready to be converted into a pompon bow.

It will of course be apparent that there are certain modifications which could be made in the machine herein described, and also in the steps followed in operating the same. However, it should be understood that such modifications are within the sprit and scope of this invention, and that the particular forms illustrated place no limitation upon my invention, except as defined in the appended claims.

What I claim is:

1. A machine for coiling and cutting strip material, comprising a shaft adapted to receive and rotatably support a roll of said strip material, means for withdrawing a length of strip material from said roll thereof and winding the same into a hank, and means for partially cutting said hank transversely of its length.

2. A machine for coiling and cutting strip material, comprising a shaft for rotatably mounting a roll of said material, a pair of spaced arms about which strip material withdrawn from said roll may be wound to form a flat hank, a plurality of cutting blades adapted to partially cut said hank transversely of its length, and means for holding a cut hank to facilitate its being tied about its cut portion.

3. A machine for making ornamental pompon bows, comprising a shaft adapted to receive and rotatably support a roll of decorative ribbon, means for withdrawing a length of ribbon from said roll and winding the same into a hank, blade means for partially cutting said hank transversely of its length, and means for holding a cut hank to facilitate its being tied about its cut portion.

4. A machine for making ornamental pompon bows, comprising a base, a standard projecting upwardly from said base, a shaft fixed on said standard and extending horizontally outward therefrom, said shaft being adapted to receive and rotatably support a roll of decorative ribbon, means for withdrawing a length of decorative ribbon from said roll and winding the same into a hank, said means comprising ribbon supporting arms slidably mounted on a revolvable bar, a hank notching element comprising two pair of cutting blades positioned with the cutting edges on one of said pair of blades in opposed relationship to the cutting edges on said other pair of blades, to excise a triangular segment of ribbon from each edge portion of the hank when the hank is thrust into contact therewith, and means for holding a notched hank to facilitate its being tied about its notched portion.

5. A machine for making ornamental pompon bows, comprising a base, a standard projecting upwardly from said base, a shaft fixed on said standard and extending horizontally outward therefrom, said shaft being adapted to receive and rotatably support a roll of decorative ribbon, means for rotatably supporting a roll of tie ribbon, means for withdrawing a length of ribbon from said roll of decorative ribbon and winding the same into a hank, a hank notching and tie ribbon severing element comprising two pair of cutting blades positioned with the cutting edges on one of said pair of blades in opposed relationship to the cutting edges on said other pair of blades, to simultaneously excise a triangular segment of ribbon from each edge portion of the hank and to sever a length of tie ribbon when said hank is advanced into contact with said element, and means for holding a notched hank to facilitate its being tied about its notched portion with a severed length of tie ribbon.

6. A machine for making ornamental pompon bows, comprising a base, a standard projecting upwardly from said base, a shaft fixed on said standard, said shaft being adapted to receive and rotatably support a roll of decorative ribbon, means for withdrawing a length of decorative ribbon from said roll thereof and winding the same into a flat hank, said means comprising ribbon supporting arms mounted for rotation about an axis parallel to the axis of said shaft, a hank notching element mounted on said standard, said hank notching element comprising two pair of cutting blades positioned with their cutting edges in opposed relationship, said two pair of cutting blades being angularly disposed toward one another so as to be spaced apart considerably more at their one end portion than their other end portion, means for rotatably supporting a roll of tie ribbon in position whereby a length of ribbon withdrawn from said roll is adapted to overlie said hank notching element and means for holding a notched hank in juxtaposition with a length of tie ribbon to facilitate said hank being tied about its notched portion, said hank being notched and a length of tie ribbon being severed when said hank is advanced against said ribbon notching element.

7. A machine for making ornamental pompon bows comprising a base, a standard projecting upwardly from said base, a shaft fixed on said standard and extending horizontally outward therefrom, said shaft being adapted to receive and rotatably support a roll of decorative ribbon, means for withdrawing a length of decorative ribbon from said roll and winding the same into a hank, said means comprising ribbon supporting arms slidably mounted on a revolvable bar, a hank notching assembly comprising two pair of cutting blades positioned with the cutting edges on one of said two pair of blades in opposed spaced relationship to and facing the cutting edges on the other of said two pair of blades, the blades of each pair being positioned to excise a triangular segment of ribbon from an edge portion of the hank opposite the triangular segment excised from the other hank edge by the other pair when said hank is advanced into contact with said blades, and advanceable cage means disposed between the said two pair provided with a hank receiving opening for advancing a hank inserted in said opening into contact with said blades while otherwise entirely foreclosing said blades from accessibility, and means for holding a notched hank to facilitate its being tied about its notched portion.

8. A machine for making ornamental pompon bows comprising: a base; a standard projecting upwardly from said base; a shaft fixed on said standard and extending horizontally outwardly therefrom, said shaft being adapted to receive and rotatably support a roll of decorative ribbon; means for withdrawing a length of decorative ribbon from said roll and winding the same into a hank, said means comprising ribbon supporting arms slidably mounted on a revolvable bar; a hank notching assembly comprising two pair of cutting blades disposed with the cutting edges of one of said two pair in opposed spaced angular relationship to and facing the cutting edges of the other of said two pair so as to be spaced apart considerably more at their upper end portions than at their lower end portions and an advanceable protective cage disposed between the said two pair; the cutting edges of one of said two pair of blades being positioned angularly in relation to each other with their end portions in substantial juxtaposition and in contact at their lower termini, the cutting edges of the other of said two pair of blades being similarly disposed in relation to each other, said cage including a pair of angular elements joined at the apexes thereof, said elements being adapted to slide with respect to said blades with said apexes positioned in the space between the two pair of blades without contacting the cutting edges thereof, the walls of each of said angular elements foreclosing one of said two pair of blades from accessibility, a superposed pair of spaced ribs transversely joining said angular elements and an oppositely positioned superposed pair of spaced ribs transversely joining said elements, said elements having a transverse recession extending across one of said angular elements through said apexes and partially into said other angular element the limits of which are defined by said superposed ribs, the said pair of ribs and said depression adapted to receive and support the ribbon hank to be notched; and means for holding a notched hank to facilitate its being tied about its notched portion.

9. In a machine for making ornamental pompon bows, an element for notching a hank of decorative ribbon, said element comprising two pair of cutting blades positioned with the cutting edges of one of said two pair in opposed angular relationship to the cutting edges of the other of said two pair, the blades of each pair being positioned to excise a triangular segment of ribbon from an edge portion of the hank opposite the triangular segment excised from the other hank edge portion by the other pair when the hank is thrust into contact with said element.

10. In a machine for making ornamental pompon bows, an element for providing opposed edge portions of a hank of ribbon with V-shaped notches, said element comprising a first pair of blades and a second pair of blades, said first pair of blades being positioned angularly in relation to each each other with their end portions in substantial juxtaposition, said second pair of blades being similarly disposed in relation to each other, the cutting edges of said first pair of blades facing the cutting edges of said second pair of blades, said first pair of blades being angularly disposed in relation to said second pair of blades.

11. A device for safely cutting hanks of strip materials transversely of their length, said device comprising two cutting means positioned in spaced opposed angular relationship for cutting a hank of decorative ribbon transversely of its length on opposite edge portions when said hank is thrust into contact therewith in the direction of convergence of the cutting means, and advanceable cage means disposed between the two cutting means provided with a hank receiving opening for advancing in said direction a hank inserted in said opening into cutting contact with said cutting means while otherwise entirely foreclosing said blades from accessibility.

12. In a machine for making ornamental pompon bows, a hank notching device comprising two cutting means positioned in spaced opposed relationship for cutting a hank of decorative ribbon transversely of its length on opposite edge portions when said hank is thrust into contact therewith, and advanceable protective cage means disposed between the two cutting means provided with a hank receiving opening for advancing a hank inserted in said opening into contact with and beyond said cutting means while otherwise entirely foreclosing the latter from accessibility, said opening being free of obstruction after advancement of said cage means beyond said cutting means to allow exterior removal of the notched hank from the device.

13. A device for safely notching hanks of strip material comprising two pair of cutting blades positioned with the cutting edges on one of said two pair of blades in opposed spaced angular relationship to and facing the cutting edges on the other of said two pair of blades, the blades of each pair being positioned to excise a triangular segment of ribbon from an edge portion of the hank opposite the triangular segment excised from the other hank edge portion by the other pair when said hank is advanced in the direction of blade-edge convergence into contact with said blades, and advanceable cage means disposed between the said two pair provided with a hank receiving opening for advancing in said direction a hank inserted in said opening into cutting contact with said blades while otherwise entirely foreclosing said blades from accessibility.

14. A device for safely notching hanks of strip material comprising two pair of cutting blades positioned with the cutting edges on one of said two pair of blades in opposed spaced relationship to and facing the cutting edges on the other of said two pair of blades, the blades of each pair being positioned to excise a triangular segment of ribbon from an edge portion of the hank opposite the triangular segment excised from the other hank edge portion by the other pair when said hank is advanced into contact with said blades, and advanceable cage means disposed between the said two pair provided with a hank receiving opening for advancing a hank inserted in said opening into contact with and beyond said blades while otherwise entirely foreclosing said blades for accessibility, said opening being free of obstruction after advancement of said cage means beyond said blades to allow removal of the notched hank from the device.

15. A notching device for providing opposed edge portions of a hank of ribbon with V-shaped notches, said device comprising two pair of cutting blades disposed with the cutting edges of one of said two pair in opposed spaced angular relationship to and facing the cutting edges of the other of said two pair so as to be spaced apart considerably more at their upper end portions than at their lower end portions, and an advanceable protective cage disposed between the said two pair; the cutting edges of one of said two pair of blades being positioned angularly in relation to each other with their end portions in substantial juxtaposition and in contact at their lower termini, the cutting edges of the other of said two pair of blades being similarly disposed in relation to each other; said cage including a pair of angular elements joined at the apexes thereof, said elements being adapted to slide with respect to said blades with said apexes positioned in the space between the two pair of blades without contacting the cutting edges thereof, the walls of each of said angular elements foreclosing one of said two pair of blades from accessibility, a superposed pair of spaced ribs transversely joining said angular elements and an oppositely positioned superposed pair of spaced ribs transversely joining said elements, said elements having a transverse recession extending across one of said angular elements through said apexes and partially into said other angular element the limits of which are defined by said superposed ribs, the said pairs of ribs and said depression adapted to receive and support the ribbon hank to be notched.

References Cited in the file of this patent

UNITED STATES PATENTS

| | | |
|---|---|---|
| 268,767 | Arnd et al. | Dec. 5, 1882 |
| 404,582 | Wheeler | June 4, 1889 |
| 1,641,288 | Neidich | Sept. 6, 1927 |
| 2,574,728 | Caraway | Nov. 13, 1951 |
| 2,654,980 | Dexter | Oct. 13, 1953 |